United States Patent [19]

Willis

[11] Patent Number: 4,464,929

[45] Date of Patent: Aug. 14, 1984

[54] TIRE CAP PRESSURE GAUGE

[75] Inventor: William M. Willis, 19440 Citronia St., Northridge, Calif. 91324

[73] Assignees: William M. Willis, Sr.; William M. Willis, Jr., both of Northridge; Jerry W. Schwarz, Granada Hills, all of Calif. ; a part interest

[21] Appl. No.: 303,912

[22] Filed: Sep. 21, 1981

[51] Int. Cl.³ .............................................. B60C 23/02
[52] U.S. Cl. ................. 73/146.8; 116/34 R; 137/228; 137/270
[58] Field of Search ................. 73/146.8, 146.2, 146.3, 73/744; 116/34 R; 137/227, 228, 270, 557

[56] References Cited

U.S. PATENT DOCUMENTS

| | | | |
|---|---|---|---|
| 1,156,268 | 10/1915 | Bromberg | 73/146.8 |
| 1,807,752 | 6/1931 | Poster | 73/146.8 |
| 2,343,582 | 3/1944 | Rist | 73/146.8 |
| 2,903,888 | 9/1959 | Gföll | 73/146.8 |
| 3,230,968 | 1/1966 | Struby . | |
| 3,572,283 | 3/1971 | Ashman . | |
| 3,670,688 | 6/1972 | Seaberg . | |
| 3,720,224 | 3/1973 | Foxhall . | |
| 3,811,459 | 5/1974 | Schmidt . | |
| 3,824,849 | 7/1974 | Foxhall . | |
| 3,866,563 | 2/1975 | Bluem . | |
| 3,889,530 | 6/1975 | Bluem . | |
| 4,072,048 | 2/1978 | Arvan | 73/146.8 |
| 4,079,691 | 3/1978 | Curado . | |
| 4,136,560 | 1/1979 | Gellos | 73/146.8 |
| 4,193,295 | 3/1980 | Curran | 73/146.8 |
| 4,236,412 | 12/1980 | Myrick | 73/744 X |

Primary Examiner—Gerald Goldberg
Assistant Examiner—John E. Chapman, Jr.
Attorney, Agent, or Firm—Poms, Smith, Lande & Rose

[57] ABSTRACT

A tire cap pressure gauge for mounting upon a tire valve stem and measuring tire pressure has a housing, a manually operated plunger extending axially through the housing, a spring extending about the plunger, a piston biased by the spring and having indicia, and a transparent insert member containing said spring, piston and plunger within the housing and having an internally threaded bore for mounting about the periphery of a threaded valve stem. The housing has multiple windows with indicia proximate thereto for viewing the translational position of the piston through the transparent insert member. Two embodiments show a lightweight, compact and easily assembled pressure measuring cap having sealless construction which utilizes close clearances and sharp corners to minimize leakage airflow. A small but insignificant amount of air leaks past the piston, providing an audible signal that the plunger is sufficiently depressed to provide an adequate pressure reading. One embodiment is adaptable to two ranges of use, automobile tire pressures and truck tire pressures, by merely changing the orientation of the plunger thereby changing the effective pressure biasing area of the piston.

4 Claims, 9 Drawing Figures

TIRE CAP PRESSURE GAUGE

This invention relates to gauges for measuring the air pressure within a vehicle tire which may be mounted as a cap on the threaded end of the tire valve stem.

Both tubed and tubeless air inflated tires are commonly used on automobiles and trucks. These tires are typically mounted upon a wheel or rim and have a valve stem extending through an aperture in the rim for inflating and pressure checking the tire. Valve stems are a common design and are typically formed of a metallic threaded valve structure that is encased in a tapered tubular hard rubber extension of the tube or tire. The metallic valve structure has an externally threaded cylindrical protrusion on which a cap or dust cover may be fitted to protect the internal valve from damage, dirt, and corrosion.

It is generally desirable to maintain automobile and truck tires at a specified inflation pressure in order to provide optimal performance characteristics of skid resistance, wear resistance, and increased gas mileage for the vehicle.

Accordingly, it is well known in the art to attach a cap structure to the valve stem of the tire to measure the air pressure in the tire. Previous devices which have accomplished this purpose have been formed of a resilient housing having an internally threaded bore for removable mounting on the threaded portion of the valve stem and have included a spring biased piston assembly with an externally visible pressure indicator. One type of stem mounted gauge known in the art has a binary-type of pressure indicator whereby a color indicator indicates one of two colors when the inflation pressure of the tire is above or below a pre-determined level of pressure. Such devices may maintain a portion of the indicator device in a pressurized condition at all times during which the device is mounted to the tire valve. An alternative construction that is known in the art is to provide a plunger-type activation mechanism which causes the valve stem of the tire to release pressurized air to the pressure indicating device only during manipulation of the plunger. Another type of device utilizes a movable graduated pressure scale and reference marker as an indicator of the internal tire pressure.

Each of these prior devices has certain disadvantages. The binary-type of pressure indicator is useable only with tires of a single specified operating pressure. Such a device is further limited in that it may indicate under-inflation, but is not capable of indicating over-inflation. These devices are further susceptible to malfunction due to dirt engaging with the seals of the moving parts. Each of these known devices uses some arrangement of seals to prevent excessive leakage of air from the tire.

Elastomeric seals have several disadvantages. They are sensitive to the ambient temperature as they soften with heat as in summertime or after extended periods of driving and are hard at cold winter temperatures. This causes the sliding and breakaway levels of friction to change in an unpredictable manner causing pressure reading inaccuracies. Elastomeric seals tend to become harder with age or heat thereby becoming brittle or inaccurate. Vulcanization can occur after extended static periods causing mating surfaces to stick together or become irregular. Finally, these seals, particularly when contaminated, provide an unpredictable resistance to motion of the visual pressure indicator; and, in the always pressurized type of stem-mounted pressure indicator, cause a slow leak of tire air resulting in underinflation after a period of time.

The more sophisticated pressure indicators that are capable of providing a numeric indication of tire pressure without having some of the previously mentioned disadvantages suffer from a complexity of construction which causes the cap to be expensive to manufacture, excessively heavy which throws the wheel out of balance, or excessively large such that they extend beyond the rim of the wheel such that the cap may come into contact with a curb of a sidewalk during parking which damages either the cap or the valve stem and may produce a flat tire. No way was known prior to the present invention for overcoming these and other disadvantages.

SUMMARY OF THE PRESENT INVENTION

It is an object of the present invention to disclose and provide a tire cap pressure gauge having this described simplicity of construction and overcoming said disadvantages.

More specifically, it is a principle object of the present invention to disclose and provide a tire cap pressure gauge as in the foregoing object and which is light in weight, thereby not disturbing the dynamic balance of the tire and wheel.

It is another object of the present invention to disclose and provide a tire cap pressure gauge that is of compact vertical dimension such that it may be mounted on the tip of a valve stem in an aesthetically pleasing, unobtrusive manner, and in such way that the cap and the stem do not protrude beyond the rim of the wheel such that they may be damaged by contact with the curb of a sidewalk.

Further objects of the present invention are to disclose and provide a tire cap pressure gauge which specifically visually indicates the actual pressure existing within the tire; provides an economy of parts and a simplicity of manufacture thereby reducing costs; is easily activated; has a visual indicator which has an acceptable accuracy and is easy to read; is sealless thereby avoiding the aforementioned disadvantages and problems associated with seals; is not susceptible to malfunction when in a dirty or corrosive environment; and wherein the same economy of parts may be adapted for use with two ranges of tire pressures, those commonly found on automobiles, and those commonly found on trucks.

Simply stated, the present invention comprises an improved five-piece, easily assembled sealless tire pressure indicator comprising: a housing; a plunger within the housing; a spring inserted into said housing about said plunger; a piston inserted onto said spring and into said housing such that the piston is biased by the spring; and a transparent insert member inserted into said housing thereby containing the plunger, spring, and piston, said insert member having an internally threaded bore for mounting about the periphery of the threaded portion of a tire valve stem.

More specifically, the present invention comprises a cylindrically shaped housing having a central cavity and three window apertures extending through said housing adjacent one end thereof, and an outwardly extending bore at the opposite end. A plunger is disposed axially within and extends through said housing for contacting the valve post portion of the valve stem of the tire and extending through an aperture in the other end of the housing for manipulation. A piston member is in close sliding fit within said central cavity and is movable in response to air pressure delivered to one surface of said piston from said tire. A spring biases said piston thereby resisting its motion in response to said air pressure. An insert member of transparent low friction material is located in said bore in fixed relation relative to said housing with a piston receiving cylinder at one end, a threaded bore at the opposite end, and an aperture through a web between said cylinder and said bore, said plunger extending through said aperture to contact the post of the valve stem and said insert member comprising the window portion of the window apertures of the housing such that the movable piston member may be viewed through the window apertures of the housing and the transparent insert member to indicate a tire pressure.

These and other objects and advantages of the present invention can be more fully understood by one skilled in the art from a consideration of detailed description of two preferred exemplary embodiments, and drawings thereof, as follows:

DETAILED DESCRIPTION OF TWO PREFERRED EXEMPLARY EMBODIMENTS

FIGS. 1–5 show a first embodiment of the tire cap pressure gauge of the present invention. The gauge is particularly contemplated to be mounted upon the externally threaded portion 12 of a valve stem 10 of a pneumatic tire or tube. Such a valve stem 10 is commonly used with tires for inflating the tire by delivering compressed air through the aperture extending through valve stem 10. The valve stem 10 is further provided with a post 14 which activates the valve portion of the valve stem 10 to selectively and controllably permit air to flow through the valve stem 10. Further, the internal pressure of the tire may be measured by attaching a pressure measuring device to the valve stem 10 while depressing post 14 placing the device in communication with the pressurized interior of the tire.

Figure 1:
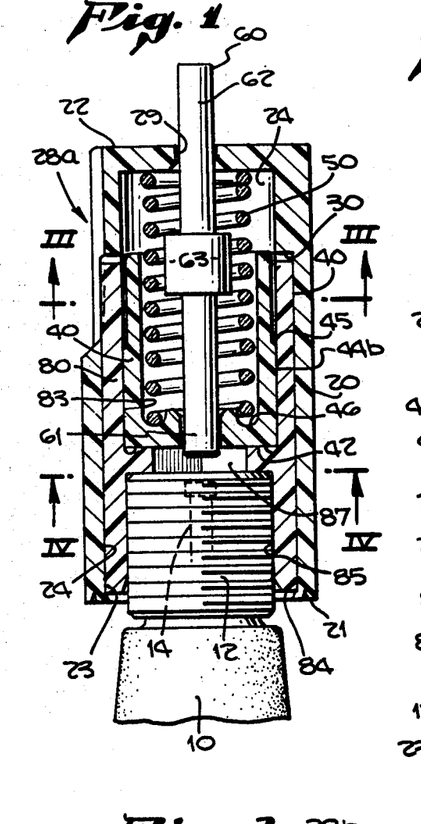
FIG. 1 is a side elevation of a first embodiment of the present invention taken in section along a plane which substantially symmetrically bisects the cylindrical aspect of the embodiment illustrated.

The apparatus of the present invention is generally formed as a compact cap which may be fitted over the end of valve stem 10 as particularly shown in FIG. 1.

Figure 5:
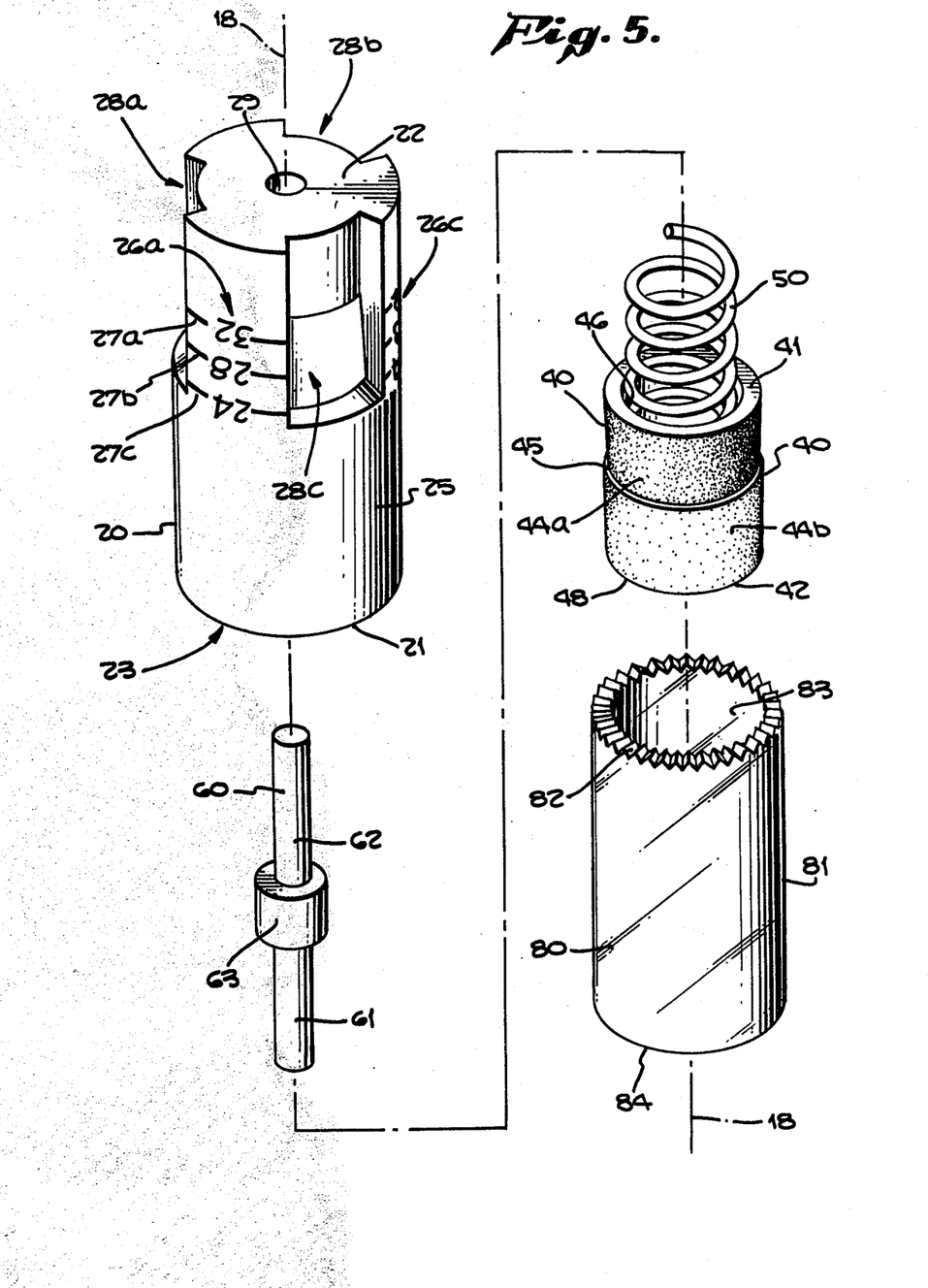
FIG. 5 is an exploded assembly view showing the parts of the apparatus of FIG. 1.

Referring to FIG. 5, the pressure gauge of the present invention is formed of five parts; specifically, a housing 20, a piston 40, a spring 50, a plunger 60, and an insert member 80, which will each be described in more detail.

The housing 20 of the tire cap pressure gauge is a substantially cylindrical structure having a centrally disposed cylindrical cavity 23. Relative to longitudinal axis 18, the housing 20 has a valve stem end 21 which is proximate the valve stem 10 when the cap is mounted upon the valve stem 10, and a free end 22 which extends outwardly from the tire, wheel, and valve stem assembly. Said cylindrical cavity 23 forms housing 20 into a hollow cylinder in which free end 22 is closed and valve stem end 21 is opened. The cylindrical cavity 23, as shown in FIG. 1, has an internal surface 24 adapted to receive insert member 80, as will be later described. Housing 20 is further provided with external surface 25 which, as shown in FIG. 5, is provided with three equiangularly displaced window apertures indicated generally at 28a, 28b, and 28c through which visual indicia on the external surface of piston 40 may be observed, as more fully described hereinafter. Extending on external surface 25 proximate window apertures 28a, 28b, and 28c and near free end 22 are multiple annular indicia indicated generally at 27a, 26b (not shown) and 27c which define planes perpendicular to the longitudinal axis 18 of the housing structure. Proximate said annular indicia 27 are respective numeric indicia, particularly shown in FIG. 5 at 26a, 26b and 26c, which give a numeric value for the air pressure within the tire by alignment of the visual indicia of piston 40 viewed through the multiple window apertures 28 with one of said annular indicia 27 and respective numeric indicia 26. The free end 22 of housing 20 is further provided with plunger aperture 29 adapted to receive one end of plunger 60 as will be further described.

Figure 2:
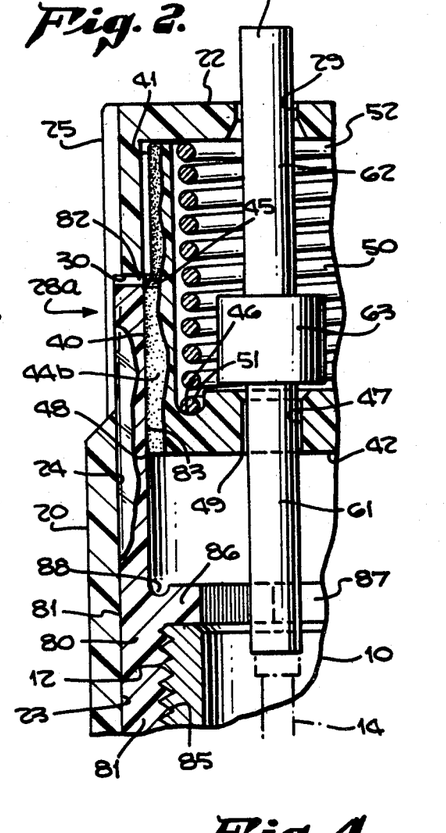
FIG. 2 is an enlarged side elevation similar to FIG. 1 showing the apparatus of FIG. 1 in a second operative condition.
Figure 3:
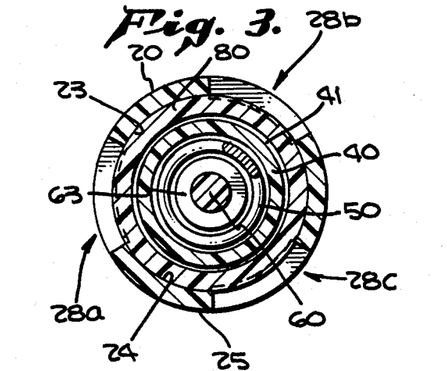
FIG. 3 is an end section of the apparatus of FIG. 1 taken in section along plane III—III of FIG. 1.
Figure 4:
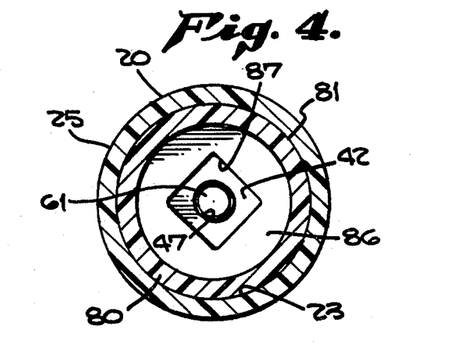
FIG. 4 is an end section of the apparatus of FIG. 1 taken in section along plane IV—IV of FIG. 1.

As shown in FIGS. 1, 2, and 5, piston 40 is provided and mounted within housing 20. Piston 40 has a substantially cylindrical exterior surface 41. One end of piston 40 is provided with a substantially planar face 42 perpendicular to the axis of cylindrical surface 41 and positioned such that, when assembled, said face is proximate the valve stem end 21 of housing 20. Piston 40 is further provided with a spring receiving recess 46 for receiving spring 50 which will be later described. In addition, the external surface 41 of piston 40 is provided with visual indicia 44a and 44b which may particularly be viewed through window apertures 28 in housing 20. The visual indicia, in the preferred embodiment, includes a change in color between the areas of indicia 44a and 44b as shown in FIG. 5 and a step-change in diameter in the form of an annular step 45. Together said visual indicia 44a and 44b and annular step 45 provide an easily viewed visual indication of the translational position of piston 40 within housing 20. Piston 40 is further provided with a bore 47 extending coaxial with longitudinal axis 18 as will be more fully described.

Spring 50 is provided as shown in FIGS. 1 and 5 in the particular form of a coil spring. The spring 50 has a piston end 51 and a housing end 52. Piston end 51 fits within the cylindrical spring receiving recess 46 of piston 40, as illustrated in FIG. 1. Housing end 52 is positioned in contact with the internal surface of free end 22 of housing 20. When assembled, the combined piston 40, housing 20, and spring 50 each have a bore with an axis coinciding with longitudinal axis 18 within which plunger 60 may be positioned and translated as will be more fully described. Spring 50 serves to bias piston 40 away from free end 22 of housing 20 in a pre-determined manner such that exposure of the face 42 of piston 40 to high pressure air from the tire causes spring 50 to be compressed and piston 40 to be translated from a position proximate valve stem end 21 of housing 20 to a position approaching free end 22 of housing 20.

Plunger 60, as previously mentioned, is provided in and extends axially through the pressure gauge assembly. Plunger 60 is of unitary construction and is formed of three portions. Valve stem end portion 61 comprises a cylindrical solid of a first diameter and extending through bore 47 of piston 40 such that it may selectively contact and depress post 14 of valve stem 10 thereby releasing air from the tire into the pressure gauge. Plunger 60 is further provided with free end portion 62 similar to and substantially symmetric with valve stem end portion 61 and extending through plunger aperture 29 of housing 20. Interspaced between valve stem end portion 61 and free end portion 62 is collar portion 63 of a second, larger diameter. Collar portion 63 has a diameter larger than the diameter of bore 47 or plunger aperture 29 such that plunger 60 may freely translate along longitudinal axis 18 between end positions defined by the contact of collar portion 63 with either the bottom of piston 40 or the internal surface 24 of the free end 22 of housing 20. In order to determine the inflation air pressure of the tire, the free end 62 of plunger 60 merely needs to be depressed thereby depressing the post 14 of valve stem 10 thereby opening the tire valve and releasing pressurized air from the tire into the pressure gauge.

Finally, the pressure gauge is provided with the transparent insert member 80, as shown in FIGS. 1 and 5, which is formed of a resilient transparent material. Transparent insert member 80 has an external cylindrical surface 81 substantially corresponding with the internal surface 24 of housing 20 such that the insert member 80 may be inserted into housing 20. It is particularly contemplated that insert member 80 insert into housing 20 in such manner that it occludes the multiple window apertures 28 of housing 20 thereby creating multiple transparent windows. The end of the transparent insert member 80 corresponding with the free end 22 of housing 20 is provided with multiple radially extending grooves formed by a ring of teeth 82 by which insert member 80 is seated against the cylindrical cavity 23 of housing 20 such that the portion of the chamber created by insert member 80 and housing 20 proximate the window apertures 28 is vented to atmosphere by air flow through said grooves where teeth 82 contact a planar step surface 30 of the cylindrical cavity 23.

Insert member 80 is further provided with a cylindrical cavity 83 adapted to receive the end face 42 and external surface 41 of piston 40. The valve stem end 84 of insert member 80 is further provided with a threaded bore 85 adapted to receive the externally threaded portion 12 of valve stem 10. Positioned on the interior surface of insert member 80 between the threaded bore 85 and the cylinder cavity 83 is a web 86 upon which piston 40 is seated in response to the biasing of spring 50. Web 86 is further provided with a square aperture 87 through which the valve stem end portion 61 of plunger 60 may extend and contact the post 14 of valve stem 10, and through which compressed air released from the tire through valve stem 10 may pass into the pressure gauge and lift piston 40.

In the preferred embodiment, planar face 42 of piston 40 has a sharply defined external corner 48 where planar face 42 intersects the exterior cylindrical surface 41 of the piston 40. Sharp corner 48 cooperates with the internal surface of cavity 83 of transparent insert member 80 to define a low-clearance airflow-resistive boundary. The cavity 83 of insert member 80 where it intersects the planar surface of web 86 is further provided with an annular undercut 88 into web 86 thereby extending the cylindrical surface of cavity 83. This extension cooperates with sharp corner 48 of piston 40 allowing a uniform cooperation between piston 40 and cavity 83 throughout the longitudinal translation of piston 40. Similarly, the valve stem end of bore 47 of piston 40 where it intersects planar face 42 of the piston 40 is provided with a sharp corner 49 for resisting airflow of pressurized air from valve stem 10 between bore 47 and plunger portion 61 extending therethrough.

Together, the close clearance fitting of piston 40 with plunger 60 and transparent insert member 80 provides a substantially air-tight variable-volume chamber for receiving pressurized air from a vehicle tire through valve stem 10 without excessively leaking that air to the environment. The chambers defined by the free end portions of plunger 60, piston 40, and housing 20 are vented to atmosphere such that a pressure gradient extends across the cross-section of piston 40. Specifically, the interior chamber of housing 20 is vented to atmosphere by airflow between free end portion 62 of plunger 60 and plunger aperture 29 of housing 20, and through the multiple radially extending grooves formed by the ring of teeth 82 of the free end of insert member 80 as seated against the planar step surface 30 of cylindrical cavity 23 of housing 20.

In operation, the free end 62 of plunger 60 is manually depressed axially into the cap such that the valve stem end 61 of the plunger 60 contacts and depresses the post 14 of valve stem 10. This manipulation of the post 14 causes compressed air within the tire to be released through the valve stem 10 and square aperture 87 into contact with the planar face 42 of piston 40. The force of the compressed air against planar face 42 of the piston causes piston 40 to translate along axis 18 such that it compresses spring 50 to a point where the pressure exerted by spring 50 is equal and opposite to the pressure exerted by the compressed air upon planar piston face 42. At this equilibrium position of translation, the annular step 45 and the visual indicia 44 may be viewed through the multiple window apertures 28 and aligned with one of the multiple annular indicia 27 and corresponding numeric indicia 26 to optically indicate the pressure of the air contained within the tire. It should be noted that due to the sealless nature of the construction, a small but insignificant amount of air leaks past the sharp corners 48 and 49 of piston face 42 during the pressure measuring process. An accompanying hissing sound occurs and has been determined beneficial as the operator may be assured that plunger 60 has been sufficiently depressed to provide an accurate pressure reading. Further, this leakage is minimized by the configuration of the sharp corners 48 and 49 and close clearances between piston 40, cavity 83, and plunger portion 61 such that the air loss during the pressure measurement procedure is insignificant.

It has been found that this exemplary arrangement can be simply and inexpensively constructed of parts having a low mass and compact vertical length. The mass of a tire cap pressure gauge constructed in accordance with the present invention is about 3 grams. The close clearances are on the order of 0.0002–0.002 inches which provides a low-friction sliding fit without the need for seals which can be damaged by dirt and corrosion or made inaccurate due to wear and environmental conditions. It is particularly contemplated that with the close-clearance sealless design that an acceptable leak rate during pressure measurement is approximately 35% of the normal out-flow rate of the tire fill valve when it is fully depressed or open. Leak rates substantially in excess of this amount would not permit an adequate pressure build up in the piston chamber to produce pressure readings with optimal accuracy.

The window apertures 28 in combination with the exterior surfaces of the housing 25 between said apertures can provide multiple evenly spaced windows and indicia surfaces. More particularly, three windows of 60 degrees each may be separated by three surfaces containing annular indicia 27 and numeric indicia 26 of 60 degrees each. Together these windows and surfaces provide an easily viewed indication of tire pressure that is conveniently and readably located relative to the manually manipulated plunger 60.

To assemble the exemplary embodiment, the housing 20 is positioned upside down. First, a plunger 60 is dropped into the housing such that free end 62 extends through plunger aperture 29. Spring 50 is inserted into housing 20 about plunger 60. Piston 40 is inserted into housing 20 such that the valve stem end 61 of plunger 60 extends through bore 47 of the piston 40 and such that the piston end 51 of spring 50 seats into spring receiving recess 46 of piston 40. Transparent insert member 80 is inserted into housing 20 about the planar face 42 and exterior surface 41 of piston 40 thereby containing all moving parts of the tire cap pressure gauge within the housing 20 and the transparent insert member 80.

Only one fastening procedure is necessary in the assembly of this exemplary embodiment. Transparent insert member 80 may be fastened to housing 20 by a variety of fastening methods. First, the clearances between the transparent insert member 80 and housing 40, specifically the external surface 81 and cylindrical cavity 23, may be so defined that the transparent insert member may be frictionally press fit into housing 20. Alternatively, an adhesive may be applied to the mating surfaces, particularly at the three junctures at which the transparent insert member 80 serves as the window surface proximate the three window apertures 28a, 28b, and 28c, of housing 20. Finally, transparent insert member 80 may be sonically welded to housing 20 at their valve stem ends.

This exemplary embodiment provides an economy of moving parts and utilizes a sealless construction which provides uniform and reliable service on tire valve stems even in adverse environments. The piston 40, plunger 60, and housing 20 of the embodiment may be formed of lightweight Derlin or other rigid elastomeric material with low-friction properties. The low, 3 gram weight of the tire cap pressure gauge minimizes the effect of the gauge upon the dynamic tire balance. The shortened vertical length of the tire cap pressure gauge is not much larger than conventionally used dust covers and is not likely to extend beyond the rim of a wheel thus minimizing the likelihood of curb damage. Finally, the visual indicia 44 and annular step 45 provide an easily viewed indication of tire pressure which may be observed relative to a graduated scale of annular and numeric indicia 26 and 27 thereby providing an accurate reading of the existing tire pressure.

Alternative Exemplary Embodiment

FIGS. 6-9 show a second alternative embodiment for the tire cap pressure gauge of the present invention. Generally, the alternative exemplary embodiment comprises a housing 120, a piston 140, a spring 150, a plunger 160, and a transparent insert member 180. The parts of the alternative exemplary embodiment are numbered with part numbering indicia between 101 and 199 which correspond to similarly numbered indicia of the apparatus of the first embodiment with numbering between 1 and 99. Similarly numbered parts of the alternative embodiment shown in FIGS. 6-9 have the same function and arrangement as the corresponding parts shown in FIGS. 1-5. For example, the spring of the alternative embodiment 150 is of similar construction and configuration as the spring of the first exemplary embodiment 50.

Figure 6:
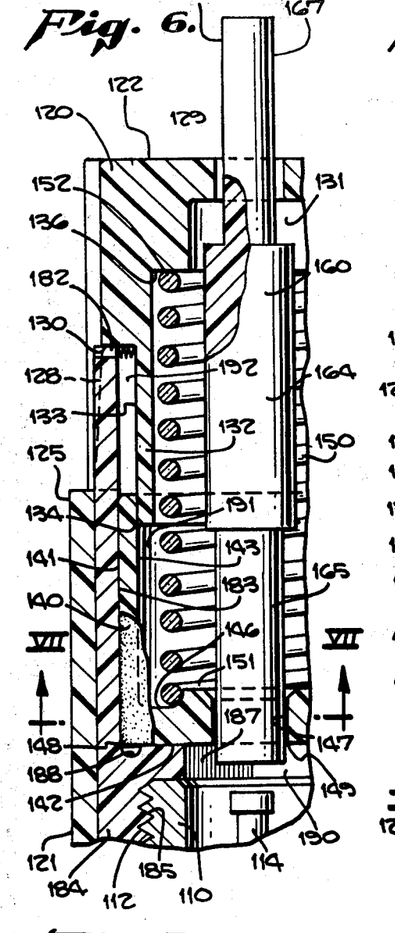
FIG. 6 is an enlarged side elevation similar to FIG. 1 of a second embodiment of the present invention assembled for use with passenger car tires.
Figure 7:
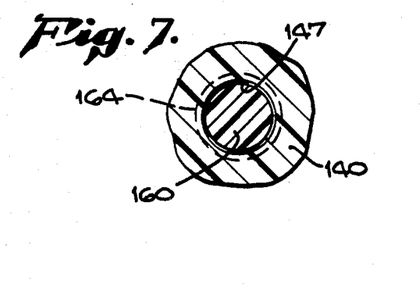
FIG. 7 is a partial end section of the apparatus of FIG. 6 taken in section along the plane VII—VII of FIG. 6.
Figure 8:
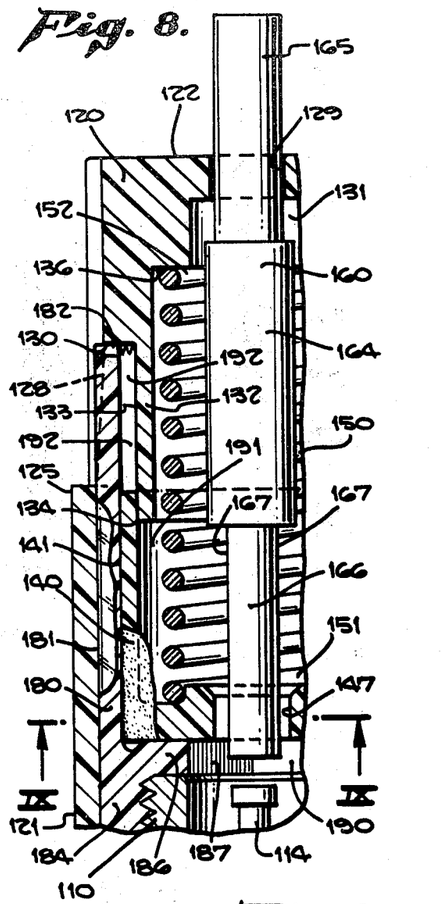
FIG. 8 is an enlarged side elevation of the apparatus of FIG. 6 showing an alternative assembly of the second embodiment for use with truck tires.
Figure 9:
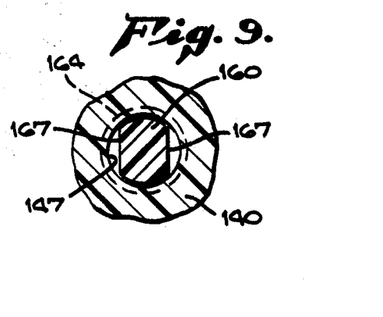
FIG. 9 is a partial end section of the apparatus of FIG. 8 taken in section along plane IX—IX of FIG. 8.

Referring initially to FIG. 6, the alternative exemplary embodiment is adapted for use with two ranges of tire pressures, those pressures commonly found in automobile tires, and those pressures commonly found in truck tires. The assembly of the alternative embodiment shown in FIGS. 6 and 7 is that configuration associated with use on automobile tires and the assembly of the alternative embodiment shown in FIGS. 8 and 9 is that configuration associated with use on truck tires.

A pressure gauge housing 120 is provided similar to that of the first embodiment. The housing 120 is provided with valve stem end 121, free end 122, annular indicia, numeric indicia, window apertures 128, plunger aperture 129, and planar step surface 130, as previously described. Additionally, the internal surface of the housing is provided with an extended longitudinal length sleeve 132 having an exterior surface 133 for cooperation with piston 140, as will be more fully described. Additionally, free end 122 of the housing 120 is provided with a collar recess 131 adapted to receive an extended length collar 164 which will be more fully described. Radially exterior of collar recess 131 is an annular planar spring mounting surface 136 for receiving and mounting the housing end 152 of spring 150.

A transparent insert member 180 of the alternative embodiment is configured similar to the transparent insert member 80 of the first embodiment. Transparent insert member 180 is provided with external surface 181, toothed edge 182, cavity 183, valve stem end 184, threaded bore 185, web 186, square aperture in the web 187 and annular undercut 188 in the web. The transparent insert member may be inserted into and attached to housing 120 by press fit, adhesion, or sonic welding, as previously described, in order to contain the plunger 160, piston 140, and spring 150.

The piston 140 of the alternative embodiment is also configured similar to the piston 40 of the first exemplary embodiment. Piston 140 is provided with an exterior surface 141, a planar face 142, a sharp corner 148 at the intersection of planar face 142 and exterior surface 141, spring receiving recess 146, bore 147, and interior sharp corner 149 where planar face 142 intersects bore 147. As an alternative, a single color visual indicia may be used on piston 140 with a contrasting color on sleeve extension 132. As the piston moves in response to tire pressure, it exposes the piston color and covers the sleeve color as viewed through the window apertures. In addition, piston 140 is further provided with an interior cylindrical surface 143 adapted to mate with the exterior surface 133 of sleeve extension 132 of housing 120 in a close clearance manner.

The valve stem end of the exterior surface 133 of sleeve extension 132 is provided with a sharp corner 134 which cooperates with the interior cylindrical surface 143 of piston 140 to minimize airflow between said exterior surface 133 and interior cylindrical surface 143. The functional air resistive aspect of this surface mating is selectively employed for use with the assembly of the alternative embodiment adapted for use with truck tires as shown in FIGS. 8 and 9, and which will be more fully described hereinafter.

As mentioned, spring 150 has housing end 152 mounted on spring mounting surface 136 of housing 120 and is further provided with piston end 151 mounted in the spring receiving recess 146 of piston 140 such that piston 140 is biased to translate toward the valve stem 110 and seat upon web portion 186 of transparent insert member 180.

The plunger 160 in the alternative embodiment is provided with a cylindrical end portion 165, an opposite cut-away end portion 166, and an extended length collar portion 164 extending therebetween. In the assembly shown in FIGS. 6 and 7, the plunger is assembled into the housing 120 such that the cylindrical end portion 165 of the plunger 160 extends through the bore 147 of piston 140. As particularly shown in FIG. 7, this assembly causes the cylindrical end portion 165 of plunger 160 and bore 147 to have a close clearance mating which minimizes airflow therebetween, particularly as provided by sharp corner 149. The cut-away end portion 166 of plunger 160 is provided with grooves or flats 167 which cut away from the cylindrical surface of the end portion. These flats 167 cooperate with the plunger aperture 129 of housing 120 to permit an unrestricted airflow therebetween.

In the assembly shown in FIGS. 8 and 9, the plunger is assembled into the housing 120 such that the cylindrical end portion 165 of the plunger 160 extends through the plunger aperture 129 of housing 120. This assembly causes the cylindrical end portion 165 of plunger 160 and plunger aperture 129 to have a close clearance mating which minimizes airflow therebetween, particularly as provided by the sharp corner at the outer end of bore 129. The cut-away end portion 166 of plunger 160 extends through bore 147 of piston 140 and grooves or flats 167 permit an unrestricted airflow therebetween.

In these configurations of the alternative embodiment, three effective chambers are created for use in measuring tire pressure. The stem chamber 190 is that chamber in communication with valve stem 110 and containing pressurized air from the tire whenever the post 114 of valve stem 110 is depressed by manipulation of plunger 160. Cylindrical chamber 191 is that chamber formed by the interior surfaces of housing 120 including the interior surface of sleeve extension 132 and a portion of the interior cylindrical surface 143 of piston 140 which is not in occlusion with the exterior surface 133 of sleeve extension 132. Tubular chamber 192 is that chamber formed by the free end of piston 140, the exterior surface 133 of housing 120, the planar step surface 130, and the cavity 183 of transparent insert member 180.

When assembled in the configuration shown by FIG. 6 for use with automobile tires, depression of plunger 160 opens the valve of valve stem 110 and pressurizes the stem chamber 190 to the pressure of the air within the tire. Both the cylindrical chamber 191 and the tubular chamber 192 are vented to atmosphere by the flats 167 and toothed ring 182, respectively. The close clearance between bore 147 of piston 140 and cylindrical end portion 165 of plunger 160, and sharp corner 149 minimize leakage from stem chamber 190 to cylindrical chamber 191 for all positions of translation of piston 140. Similarly, the close clearance between external cylindrical surface 141 of piston 140 and internal cavity 183 of transparent insert member 180, and sharp corner 148 minimize leakage from stem chamber 190 to tubular chamber 192 for all positions of translation of piston 140.

In this configuration, the effective pressure biasing cross-sectional area of the piston 140 is defined by the portion of planar face 142 of the piston 140, outward of bore 147.

When assembled in the configuration shown by FIG. 8 for use with truck tires, depression of plunger 160 opens the valve of valve stem 110 and pressurizes the stem chamber 190 to the pressure of the air within the tire. The flats 167 of cut-away end portion 166 of plunger 160 extending through bore 147 of piston 140 vents the pressurized air in stem chamber 190 to cylindrical chamber 191. Tubular chamber 192 is vented to atmosphere by the toothed ring 182 of transparent insert member 180 as it mates with planar step surface 130. The close clearance between external cylindrical surface 141 of piston 140 and internal cavity 183 of transparent insert member 180, and sharp corner 148 minimize leakage from stem chamber 190 to tubular chamber 192 for all positions of translation of piston 140. Similarly, the close clearance between interior cylindrical surface 143 of piston 140 and the exterior surface 133 of the sleeve extention 132 of housing 120, and sharp corner 134 minimize leakage from cylindrical chamber 191 to tubular chamber 192 for all positions of translation of piston 140.

In this configuration, the effective pressure biasing area of the piston 140 is defined by the portion of the planar face 142 of the piston 140, outward of the interior cylindrical surface 143 of the piston 140.

Thus, by merely selecting the orientation of the plunger 160 during assembly, the effective pressure biasing area of the piston 140 is changed and the range of tire pressures measured by the gauge changes from automobile associated to truck associated pressures.

Having thus disclosed two exemplary embodiments of a tire cap pressure gauge in accordance with the present invention, it should be apparent to those skilled in the art that the present invention accomplishes the objectives and attains the advantages discussed herein and that various modifications, adaptations, and variations can be made within the scope and spirit of the present invention which is limited only as defined by the following claims.

What is claim is:

1. A tire valve stem mounted tire pressure indicator gauge for giving a visually perceivable indication of the associated tire air pressure, said gauge comprising:
   a hollow housing having opaque side walls;
   window aperture means in said housing side walls for providing visual access to the interior of said housing;
   a hollow insert member of transparent low friction material inserted into said housing through an open end thereof and having a piston receiving chamber adjacent said window aperture means;

a piston moveably mounted in close sliding fit relation within said piston receiving chamber said piston being moveable into positions within said chamber wherein it is visually perceivable from outside said housing through said window aperture means;

means for mounting said housing via said insert member to a tire valve stem;

means for communicating tire air from said stem through said insert member into said chamber in which said piston is moveably mounted with said air directly contacting said piston, air flow past said piston being impeded but not prevented by said close sliding fit relation between said piston and insert member;

means for normally venting said chamber on the side of said piston facing into said housing to atmosphere in an audible manner when air flows past said piston; and plunger means having a first end protruding from said housing for manual engagement, a central portion within said housing and passing through said piston and insert member and a lower end for engaging the valve post of said tire valve stem when said first end is manually depressed, and wherein said housing, piston and insert member are each provided with plunger receiving bores of sufficient size to allow associated portions of said plunger to past freely therethrough.

2. A tire valve stem mounted tire pressure indicator gauge for giving a visually perceivable indication of the associated tire air pressure, said gauge comprising: a hollow housing having a generally cylindrical sidewall, a first end partially closed by an end wall having a plunger receiving bore therethrough and a second open end, said housing having an interior cavity opening outwardly of said housing through said plunger receiving bore and said second open end;

window aperture means adjacent said first end for providing visual access to said cavity through said housing sidewall;

a hollow insert member of transparent material inserted into said housing cavity allowing visual observation of the housing cavity therethrough, said insert member having a piston receiving chamber adjacent said window aperture means, means for mounting said insert member and housing to a tire valve stem received into said housing second open end and means for communicating tire air to said piston receiving chamber when the tire valve associated with said stem is opened, said means for communicating tire air including an aperture through a web portion of said insert member adjacent said chamber;

piston means including a piston member in close sliding fit relation within said piston receiving chamber for movement therein in response to air pressure from said tire valve stem, air flow past said piston being impeded but not prevented by said close sliding fit relation between said piston and insert member spring means for biasing said piston in a direction to resist movement in response to said air pressure;

means for normally venting said piston receiving chamber on the side of said piston facing into said housing to atmosphere in an audible manner when air flow past said piston; and plunger means for operating said valve of said stem to open position to communicate tire air to said piston receiving chamber through said aperture, said plunger means including a portion passing freely through said aperture whereby operation of said plunger means causes tire air to flow against said piston within said piston receiving chamber and to atmosphere through said means for normally venting said insert chamber in audible manner and said window aperture means and transparent material of said insert allowing visual observation from outside of said housing of the location of said piston within said insert member and housing to indicate thereby a magnitude of tire air pressure.

3. A tire valve stem mounted tire pressure indicator gauge for giving a visually perceivable indication of the associated tire air pressure, said gauge comprising:

a hollow housing having opaque side walls;

window aperture means in said housing side walls for providing visual access to the interior of said housing;

a hollow insert member of transparent low friction material inserted into said housing through an open end thereof and having a piston receiving chamber adjacent said window aperture means;

a piston moveably mounted in close sliding fit relation within said piston receiving chamber, said piston being moveable into positions within said chamber wherein it is visually perceivable from outside said housing through said window aperture means;

means for mounting said housing via said insert member to a tire valve stem;

means for communicating tire air from said stem through said insert member into said chamber in which said piston is moveably mounted with said air directly contacting said piston, air flow past said piston being impeded but not prevented by said close sliding fit relation between said piston and insert member, said air flow giving an audible signal that air pressure of the associated tire is being tested; and plunger means having a first end protruding from said housing for manual engagement, a central portion within said housing and passing through said piston and insert member and a lower end for engaging the valve post of said tire valve stem when said first end is manually depressed, and wherein said housing, piston and insert member are each provided with plunger receiving bores of sufficient size to allow associated portions of said plunger to pass freely therethrough, wherein said plunger means comprises a plunger member provided with a cylindrical end portion, a cut-away end portion, and a collar portion therebetween to cooperate with said piston such that the plunger may be inserted into the housing and through the piston and insert member in either one of two selected orientations associated with one of two desired pressure ranges for said indicator.

4. A tire valve stem mounted tire pressure indicator gauge for giving a visually perceivable indication of the associated tire air pressure, said gauge comprising:

a hollow housing having opaque said walls;

window aperture means in said housing side walls for providing visual access to the interior of said housing, a hollow insert member of transparent low friction material inserted into said housing through an open end thereof and having a piston receiving chamber adjacent said window aperture means;

a piston moveably mounted in close sliding fit relation within said piston receiving chamber, said piston being moveable into positions within said chamber wherein it is visually perceivable from outside said housing through said window aperture means;

means for mounting said housing via said insert member to a tire valve stem;

means for communicating tire air from said stem through said insert member into said chamber in which said piston is moveably mounted with said air directly contacting said piston, air flow past said piston being impeded but not prevented by said close sliding fit relation between said piston and insert member, said air flow giving an audible signal that air pressure of the associated tire is being tested; and plunger means having a first end protruding from said housing for manual engagement, a central portion within said housing and passing through said piston and insert member and a lower end for engaging the valve post of said tire valve stem when said first end is manually depressed, and wherein said housing, piston and insert member are each provided with plunger receiving bores of sufficient size to allow associated portions of said plunger to pass freely therethrough, wherein said plunger member may be selectively inserted into said housing in one of two selected orientations, said selected orientation causing said piston to have one of two effective pressure biasing areas causing said pressure indicator to operate in one of two optimum ranges of pressure measurement.

* * * * *